Oct. 3, 1939.                G. P. MARSDEN                 2,174,798
                              SIZING APPARATUS
                            Filed Nov. 23, 1937
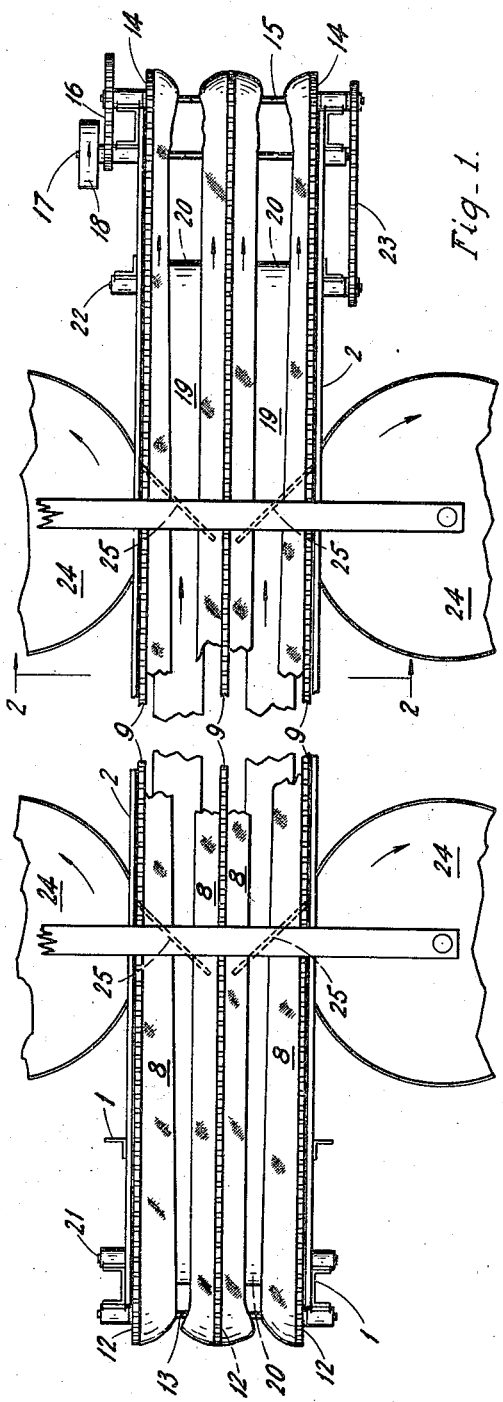
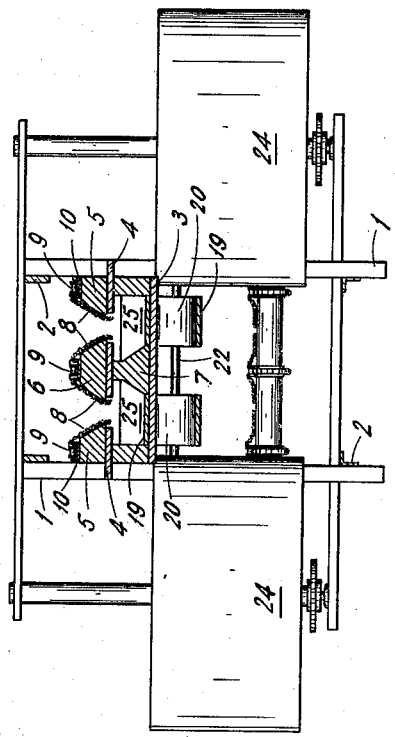
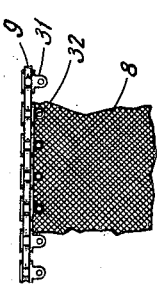
INVENTOR.
George P. Marsden.
BY Philip A. Minnis
        ATTORNEY.

UNITED STATES PATENT OFFICE 2,174,798

SIZING APPARATUS

George P. Marsden, Riverside, Calif., assignor to Food Machinery Corporation, San Jose, Calif., a corporation of Delaware Application November 23, 1937, Serial No. 176,055

2 Claims. (Cl. 209—102)

The present invention relates to fabric conveyors such as the canvas drapers employed, for example, in sizing apparatus for use with lemons, or pears and the like of the divergent type where the fruit is carried between opposed conveyors which gradually diverge to permit the fruit to drop therebetween according to its size.

Usually, such canvas drapers are secured along one edge to the links of the drive chain therefor parallel to but spaced from the pitch line of the chain, which usually runs in a grooved guideway along the grading rails of the sizing apparatus. It has been customary to cut such drapers along lines parallel to one set of threads used in weaving the cloth, and with drapers of this character, it has been found that weather changes affect the canvas and cause it to stretch or shorten with changes in humidity. For example, canvas which when first applied extends evenly along the chain, will shrink during wet weather and pull the canvas loose from the rivets. Some attempts have been made to remedy this disadvantage by allowing slack in the canvas between the rivets holding it to the chain, but in dry weather it has been found that this construction provided an excessive ruffling effect which interferes with the sizing operation and has even been found to permit the fruit to work under the drapers instead of being supported thereon. Also, if the canvas extends evenly along the chain when straight, some stretching of the canvas must occur when the chain and canvas engage and leave a sprocket, as the points of attachment of the canvas to the chain describe an arc of greater radius than that described by the pitch line of the chain for a part of their travel.

It is the object of the present invention to overcome the disadvantageous results noted above, and to provide a fabric draper for conveyor systems or the like which can be attached to the chain in a smooth condition, and which will not be affected by changes in weather conditions, or in passing around the chain sprockets, but will lie flat and even with the chain at all times.

Another object of the invention is to provide a draper for conveying systems such as for sizing apparatus, and the like, in which the draper fabric, such as canvas for example, is cut on the bias, which will allow the threads of the cloth to shrink or stretch without affecting the length of the canvas with respect to the chain, as such shrink or stretch will affect the width only.

Another object of the invention is to provide an improved fruit sizer which obtains a more uniform sizing operation.

Other objects will appear from the following description of a preferred embodiment with reference to the accompanying drawing, in which:

Fig. 1 is a plan view partially broken away of sizing apparatus employing drapers constructed in accordance with the instant invention.

Fig. 2 is a transverse sectional elevation taken in the plane of the line 2—2 in Fig. 1.

Fig. 3 is a fragmentary plan view of a part of a draper showing the chain and the method of attaching the canvas thereto.

Referring to Figs. 1 and 2, the sizing apparatus illustrated embodies a suitable framework including the several standards 1, to which are secured the longitudinally extending side rails 2 carrying a table 3 therebetween. Shelves 4 mounted on the side rails 2 form supports for opposed grading rails 5 which extend longitudinally of the machine in opposed relation to a central grading rail 6 mounted on a standard 7 carried by the table 3. The central grading rail 6 is of generally triangular cross section as shown, to form inclined faces cooperating with corresponding opposed inclined faces on the grading rails 5 to form twin trough-like gradeways extending longitudinally of the machine.

The machine illustrated, is designed to receive the fruit to be graded at its left end, as viewed in Fig. 1, and as the fruit is deposited in the gradeway it is carried therealong by means of a plurality of endless flexible aprons or drapers 8, the upper runs of which overlie and ride along the opposing inclined faces of the grading rails 5 and 6. The aprons are secured to and driven by three endless chains 9 which are arranged to travel in channel rails 10 above the grading rails 5 and 6 and are trained around suitable sprockets 12 secured to idler shaft 13 at the feed end of the machine, and suitable sprockets 14 secured to drive shaft 15 at the discharge end of the machine. The shaft 15 is driven through chain 16 from a power shaft 17, carrying the driving pulley 18 to which power may be supplied from any suitable source to drive the chains and aprons in the direction indicated by the arrows.

It will be understood that in operation, the rails 5 are adjusted so that the width of the gradeways progressively increases from the receiving end of the machine toward the discharge end so that as the fruit is carried along the gradeways the individual pieces are released at various points according to their size. As the fruit is released, it is received upon respective conveyor belts 19 which extend beneath the gradeways and are trained around respective pulleys 20 secured to transverse shafts 21 and 22. The conveyor belts 19 are driven in the same direction and preferably at the same speed as the aprons 8 by means of the chain 23 trained around suitable sprockets secured to the shafts 15 and 22, and distribution of the fruit from the belts 19 to the packing bins 24 may be effected by means of shunts 25 extending diagonally across the conveyor belts. While only two bins are illustrated as associated with each gradeway, it will be understood that additional bins may be, and generally would be, provided in practice.

As shown in Fig. 3, the chain 9 is provided with apertured wing links 31 which correspond in their spacing to the rivet holes in the draper 8 so that the draper 8 is secured to the chain as by rivets 32 and will lie evenly during its travel with the chain. It will be noted that wings of links 31 are located at the upper edge of the links during their travel along the channel rails 10 so that the points of connection of the draper to the chain are parallel to but spaced above the pitch line of the chain. The draper 8 is cut on the bias to provide a certain amount of flexibility between the adjacent rivets 32, whereby any shrink or stretch of the threads of the draper because of the change in weather conditions are readily accommodated in the width of the fabric without affecting the length. The threads of the fabric act as a long series of parallellograms with fixed points along the chain, so that dimension changes will not change its surface characteristics, and the draper will at all times lie flat and even with the chain. The bias-cut canvas also accommodates the change in length of the rivet connections relative to the pitch line of the chain at the beginning and at the end of the travel of the chain and draper around the sprockets.

The increased flexibility of the sizing drapers by employing bias cut fabric has also been found to provide more uniform sizing because it eliminates the tendency of the fruit to ride by the proper sizing point as occurs with a taut draper.

While I have shown and described a preferred embodiment of the invention, it will be understood that the invention is capable of variation and modification from the form shown, so that its scope should be limited only by the scope of the claims appended hereto.

I claim:

1. In a fruit sizer comprising a divergent gradeway, a metallic driving element along each side of said gradeway, opposed drapers of fabric associated with said gradeway, each said draper being secured at one edge only to the associated driving element for movement along said gradeway to carry fruit therealong, said fabric being cut bias to place the threads thereof diagonal to the respective driving elements to thereby confine the contraction and expansion of said fabric due to changes in humidity, laterally of said driving elements.

2. In a fruit sizer comprising a divergent gradeway, and opposed drapers mounted for movement along said gradeway to carry fruit therealong, each draper comprising an endless metallic driving element and a strip of fabric having one edge only secured to said driving element, and depending therefrom to rest on said gradeway to form one of the fruit supporting and sizing surfaces thereof, said fabric being cut on the bias so the threads thereof for its entire surface are disposed diagonally relative to the metallic driving element.

GEORGE P. MARSDEN.